US010815765B2

(12) United States Patent
Lites et al.

(10) Patent No.: US 10,815,765 B2
(45) Date of Patent: Oct. 27, 2020

(54) ENHANCED VISCOSITY OF POLYMER SOLUTIONS IN HIGH SALINITY BRINES

(71) Applicant: Schlumberger Technology Corporation, Sugar Land, TX (US)

(72) Inventors: Lindsay Lites, Sugar Land, TX (US); Bruce Alexander MacKay, Sugar Land, TX (US); Andrey Mirakyan, Katy, TX (US); Blake McMahon, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 330 days.

(21) Appl. No.: 14/748,405

(22) Filed: Jun. 24, 2015

(65) Prior Publication Data

US 2016/0376497 A1 Dec. 29, 2016

(51) Int. Cl.
*E21B 43/267* (2006.01)
*C09K 8/68* (2006.01)
*E21B 43/16* (2006.01)
*E21B 43/26* (2006.01)
*C09K 8/88* (2006.01)

(52) U.S. Cl.
CPC ............ *E21B 43/267* (2013.01); *C09K 8/68* (2013.01); *C09K 8/685* (2013.01); *C09K 8/88* (2013.01); *C09K 8/887* (2013.01); *E21B 43/16* (2013.01); *E21B 43/26* (2013.01)

(58) Field of Classification Search
CPC ......... E21B 43/26; E21B 43/267; C09K 8/68; C09K 8/685; C09K 8/88; C09K 8/887
See application file for complete search history.

(56) References Cited

U.S. PATENT DOCUMENTS

| 3,058,909 A | 10/1962 | Kern | |
|---|---|---|---|
| 3,937,283 A | 2/1976 | Blauer et al. | |
| 3,974,077 A | 8/1976 | Free | |
| 4,762,625 A * | 8/1988 | Dadgar | C09K 8/10 252/363.5 |
| 5,080,809 A * | 1/1992 | Stahl | C08F 226/06 166/270.1 |
| 5,439,057 A * | 8/1995 | Weaver | C09K 8/08 166/283 |

(Continued)

FOREIGN PATENT DOCUMENTS

CA 2630033 C 8/2013

*Primary Examiner* — Crystal J Miller
(74) *Attorney, Agent, or Firm* — Rodney Warfford (57) ABSTRACT

Methods of treating a subterranean formation penetrated by a wellbore include providing environmental water, admixing a viscosifying amount of a polymer and at least one divalent cation with the environmental water to form an admixture, and pumping the admixture through the wellbore at a rate and pressure sufficient to treat the subterranean formation. The viscosity of the admixture increases after the at least one divalent cation, the viscosifying amount of polymer and the environmental water are admixed. Such viscosity increase may be at least about 5% over at least a 10 minute period after the admixture is prepared. The divalent cation(s) may be selected from the group consisting of barium, calcium, copper(II), iron(II), magnesium, manganese(II), strontium, tin(II), zinc, and mixtures thereof. Further, the divalent cation(s) may be provided in the form of a salt with one or more anions selected from acetate, bicarbonate, nitrate, chloride, bromide, iodide, sulfate ion, and mixtures thereof.

21 Claims, 4 Drawing Sheets

(56) References Cited

U.S. PATENT DOCUMENTS

| | | | | |
|---|---|---|---|---|
| 6,030,928 A * | 2/2000 | Stahl | ............... | C08F 226/06 |
| | | | | 507/121 |
| 8,030,254 B2 * | 10/2011 | Phatak | ............... | C09K 8/685 |
| | | | | 166/305.1 |
| 8,327,935 B2 * | 12/2012 | Crill | ............... | C09K 8/665 |
| | | | | 166/271 |
| 8,973,659 B2 * | 3/2015 | Karadkar | ............... | C09K 8/514 |
| | | | | 166/270 |
| 9,062,238 B2 * | 6/2015 | Kesavan | ............... | C09K 8/08 |
| 2004/0209780 A1 | 10/2004 | Harris et al. | | |
| 2005/0261138 A1 * | 11/2005 | Robb | ............... | C09K 8/68 |
| | | | | 507/209 |
| 2006/0014648 A1 * | 1/2006 | Milson | ............... | C09K 8/08 |
| | | | | 507/213 |
| 2008/0217011 A1 * | 9/2008 | Pauls | ............... | C09K 8/512 |
| | | | | 166/294 |
| 2010/0093565 A1 * | 4/2010 | Phatak | ............... | C09K 8/685 |
| | | | | 507/219 |
| 2010/0311621 A1 * | 12/2010 | Kesavan | ............... | C09K 8/08 |
| | | | | 507/212 |
| 2011/0146980 A1 * | 6/2011 | Crill | ............... | C09K 8/68 |
| | | | | 166/271 |
| 2013/0213657 A1 * | 8/2013 | Dobson, Jr. | ............... | C09K 8/24 |
| | | | | 166/308.5 |
| 2013/0306317 A1 * | 11/2013 | Karadkar | ............... | C09K 8/514 |
| | | | | 166/305.1 |
| 2015/0107832 A1 * | 4/2015 | DeWolf | ............... | C09K 8/52 |
| | | | | 166/266 |
| 2015/0197686 A1 * | 7/2015 | Mason | ............... | C09K 8/605 |
| | | | | 166/278 |
| 2015/0284624 A1 * | 10/2015 | Li | ............... | C09K 8/685 |
| | | | | 166/308.3 |
| 2016/0083644 A1 * | 3/2016 | Ogle | ............... | C09K 8/706 |
| | | | | 166/278 |

* cited by examiner

ENHANCED VISCOSITY OF POLYMER SOLUTIONS IN HIGH SALINITY BRINES

FIELD

The field to which the disclosure generally relates to is compositions and methods for subterranean formation treatment fluids. In particular, the disclosure relates to treatment fluids prepared from environmental water used for stimulating petroleum production from a wellbore penetrating a subterranean formation.

BACKGROUND

This section provides background information to facilitate a better understanding of the various aspects of the disclosure. It should be understood that the statements in this section of this disclosure are to be read in this light, and not as admissions of prior art.

Hydraulic fracturing is a common and well-known enhancement method for stimulating the production of hydrocarbon bearing formations. The process involves injecting a fracturing fluid down a wellbore at high pressure. The fracturing fluid is often a mixture of water with chemicals to affect viscosity (such as viscosifying polymers), friction reduction, wettability, pH control and bacterial control, and in some stages proppant. The proppant may be made of natural materials or synthetic materials. Typically, the fracturing fluid is mixed at the surface with the appropriate chemicals and proppant particulates and then pumped down the wellbore at a pressure sufficient to form fractures in the subterranean formation.

The fracturing process often includes pumping a fracturing fluid from the surface through a cased wellbore to reach a desired zone in a subterranean formation through perforations formed in the casing. Pressure is then provided from the surface to the desired formation zone in order to open a fracture, or fractures, in the subterranean formation.

Typically, large volumes of fluid are required in a hydraulic fracturing operation, as well as many other subterranean formation treatment operations. The large fluid volume requirement, high cost of produced water transportation and disposal, high cost of fresh water, limited amount of fresh water source and ecological implications often make it preferable to utilize the water that is already produced by a well either during the drilling process or from other nearby wells, or other environment water sources. Produced water reuse in polymer containing fluids often presents many challenges due to the chemical complexity of the water, which may affect the ability to achieve adequate viscosity using the produced water.

Produced water may be any water source that is produced from a geological reservoir. Produced water sometimes comes from the process of lifting oil and gas from water-bearing formations—typically ancient sea or lake beds. As oil and gas is lifted to the surface, water is brought along with it, and separated therefrom. Produced water salinity often ranges from 100 mg/l to 400,000 mg/l (seawater is 35,000 mg/l). Most produced waters contain some subset or mixture of dissolved inorganic salts, dispersed oil droplets, dissolved organic compounds (dissolved "oil"), treatment and workover chemicals, dissolved gases (particularly hydrogen sulfide and carbon dioxide), bacteria and other living organisms, and dispersed solid particles.

There exists a need to prepare treatment fluids with produced water, or other environmental water sources, which has adequate viscosity, and such need is met at least in part by embodiments described in the following disclosure.

SUMMARY

This section provides a general summary of the disclosure, and is not a necessarily a comprehensive disclosure of its full scope or all of its features.

In a first aspect of the disclosure, methods of treating a subterranean formation penetrated by a wellbore include providing environmental water, admixing a viscosifying amount of a polymer and at least one divalent cation with the environmental water to form an admixture, and pumping the admixture through the wellbore at a rate and pressure sufficient to treat the subterranean formation. The viscosity of the admixture increases after the polymer, the at least one divalent cation and environmental water are mixed. Such viscosity increase may be at least about 10% over at least a 10 minute period after the admixing, or even from about 15% to about 50%. In other cases, the viscosity of the admixture increases by at least 10% over at least a 30 minute period after the admixing. In yet other cases, the viscosity of the admixture increases from about 10% to about 50%. The divalent cation(s) may be selected from the group consisting of barium, calcium, copper(II), iron(II), magnesium, manganese(II), strontium, tin(II), zinc, and mixtures thereof. Further, the divalent cation(s) may be provided in the form of a salt with one or more anions selected from acetate, nitrate, chloride, bromide, iodide, sulfate ion, bicarbonate, and mixtures thereof. An optional viscosifying polymer may be admixed with the environmental water, and/or a crosslinker may also be mixed therewith.

In another aspect of the disclosure, a method of preparing a fluid includes providing environmental water and admixing a viscosifying amount of a polymer and at least one divalent cation with the environmental water to form an admixture, where viscosity of the admixture increases by at least about 5% over at least a 30 minute period after the polymer, the at least one divalent cation and environmental water are mixed. In some cases the viscosity of the admixture increases by at least about 10% over at least a 10 minute period after the at least one divalent cation, the polymer and the environmental water are admixed, or even increases from about 15% to about 50%. In yet other cases, the viscosity of the admixture increases from about 10% to about 50%. The divalent cation(s) may be selected from the group consisting of barium, calcium, copper(II), iron(II), magnesium, manganese(II), strontium, tin(II), zinc, and mixtures thereof. Further, the divalent cation(s) may be provided in the form of a salt with one or more anions selected from acetate, nitrate, chloride, bromide, iodide, sulfate ion, bicarbonate, and mixtures thereof. An optional crosslinker may be included in the admixture in some embodiments. The admixture may be injected into a wellbore and a subterranean formation is treated. In some instances, the subterranean formation is fractured.

Yet another aspect of the disclosure includes a method where environmental water is provided, a viscosifying amount of a polymer and at least one divalent cation are admixed with the environmental water to form an admixture, a proppant is added to the admixture, the admixture is injected through a wellbore penetrating a subterranean formation, and the proppant is placed in a fracture formed in the subterranean formation. In some instances, the viscosity of the admixture increases by at least about 5% over at least a 10 minute period after the admixture is prepared, or even from about 10% to about 50%. The divalent cation(s) may be selected from the group consisting of barium, calcium, copper(II), iron(II), magnesium, manganese(II), strontium, tin(II), zinc, and mixtures thereof. Further, the divalent cation(s) may be provided in the form of a salt with one or more anions selected from acetate, nitrate, chloride, bromide, iodide, sulfate ion, bicarbonate, and mixtures thereof. Also, an optional crosslinker may be included in the admixture.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description and examples are presented herein solely for the purpose of illustrating the various embodiments and should not be construed as a limitation to the scope and applicability of the disclosure. While the compositions are described herein as comprising certain materials, it should be understood that the composition could optionally comprise two or more chemically different materials. In addition, the composition can also comprise some components other than the ones already cited. In the summary and this detailed description, each numerical value should be read once as modified by the term "about" (unless already expressly so modified), and then read again as not so modified unless otherwise indicated in context. Also, in the summary and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors were in possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Inventors have discovered addition of divalent cations in combination with viscosifying polymer(s) to environmental water sources can be effective in increasing the viscosity of the environmental water, and thus useful in forming viscous treatment fluids. By increasing the viscosity of the environmental water in such way, a subterranean formation treatment fluid, such as a fracturing fluid, may be prepared at the surface, and pumped into a wellbore at a pressure sufficient to treat a target zone in the formation. In some aspects, other components may be added to the mixture as well. For example, a crosslinker, and optional viscosifying polymer, could be added to form a dual viscosity system.

In some cases, methods of the disclosure are useful to form fluids that are shear-tolerant high-temperature subterranean treatment fluids for high pressure high temperature environments, which provide long-term thermal stability without losing effective viscosity properties. Such fluids often are dual viscosifier containing fluids featuring an early low-temperature reaction and a secondary temperature-activated reaction, which provides low shear and thermal stability at temperatures beyond about 260 degrees Fahrenheit, beyond about 340 degrees Fahrenheit, or even beyond about 375 degrees Fahrenheit. Such shear-tolerant fluids may provide better proppant transport and use fewer additives compared with conventional crosslinked fracturing fluids. In other aspects, methods and fluids according to the disclosure are useful in subterranean formation environments where temperature is from about 150 degrees Fahrenheit to about 260 degrees Fahrenheit (so called "mid temperature" wells), or even subterranean formation environments where temperature is about 150 degrees Fahrenheit or lower. Further, it is within the scope and spirit of the disclosure that fluids and methods using or forming such fluids, are single viscosifier fluids, dual viscosifier fluids, and the like.

In embodiments of the disclosure, environmental water may be supplied from any practical source available given the type of treatment operation and location. Any suitable outdoor environmental water source, such as lake water, sea water, aquifer, produced water, pond water and the like, may be used. As used herein, the term 'environmental water' also includes fresh water, supplied from a source other than the environmental source, which is mixed with water from the environmental water source. Often, 'produced water' is a term used in the petroleum industry to describe water that is produced, and stored at the surface, as a byproduct along with the oil and gas production, or subterranean formation treatment. Produced water is often a brine, having a high concentration of total dissolved solids of monovalent cations. Oil and gas reservoirs commonly have water as well as hydrocarbons, sometimes in a zone that lies under the hydrocarbons, and sometimes in the same zone with the oil and gas. When produced, such water may be a useful source as well.

In some oil production techniques, maximum oil recovery by waterflooding is often implemented, in which water is injected into the reservoirs to help force the oil to the production wells. The injected water eventually reaches the production wells, and so in the later stages of waterflooding, the produced water proportion ("cut") of the total production increases. This may also provide a source of environmental water. In some cases, a volume of hydraulic fracturing fluid, used to increase permeability, porosity, and hydrocarbon yield of reservoir rocks, is recovered at the end of the process (so called flowback fluids), which may also may also serve as a source of environmental water. Water is also generated from scrubbers in power plants, dewatering and extracting uranium resources, carbon sequestration, and development of unconventional energy sources. Although derived from a variety of different sources, these all represent some of the useful sources of environmental waters, which are extracted in the process of trying to develop, extract, or dispose of energy-related products.

Divalent cations useful in embodiments of the disclosure have a charge of +2, and may include, for example, barium, calcium, copper(II), iron(II), magnesium, manganese(II), strontium, tin(II), zinc, and the like, although not necessarily limited thereto. The divalent cations are generally ionically bonded with one or more anions, forming a salt, which adequately dissociates and dissolves when admixed with a produced water source. Some non-limiting examples include acetate ($C_2H_3O_2^-$), nitrate ($NO_3^-$), chloride ($Cl^-$), bromide ($Br^-$), iodide ($I^-$), sulfate on ($SO_4^{2-}$), bicarbonate ($HCO_3^-$), and the like. In some embodiments of the disclosure, salts such as calcium chloride ($CaCl_2$) and/or magnesium chloride ($MgCl_2$) are used as the divalent cation source.

Any suitable amount of divalent cation may be added to the environmental water source, and viscosifying polymer, in order to achieve a target viscosity of the treatment fluid. In some aspects, the amount of a salt, or mixture of salts, which provide the divalent cation(s) may be added to the produced water in an amount from about 1% by weight to about 30% by weight, from about 2% by weight to about 20% by weight, or even from about 5% by weight to about 15% by weight.

Method embodiments may also include incorporation of any of a variety of polysaccharides used as viscosifying polymers with the environmental water/divalent cation mixtures, including, but not limited to, guar gums, high-molecular weight polysaccharides composed of mannose and galactose sugars, guar derivatives such as hydroxypropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, may be useful as viscosifying agents as well. Polysaccharide compounds can be combined with other viscosifying agents, such as viscoelastic surfactants. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris et. al., incorporated herein by reference. These may be added to, or included in the environmental water source, or a combination of both.

Whether incorporated in, already inclusive in the environmental water source, or both, the effective amount of a viscosifying polymer may be any suitable concentration. In various embodiments hereof, the viscosifying polymer can be present in an amount of from about 5 to about 60 pounds per thousand gallons (ppt) of fluid (liquid phase), or from about 15 to about 40 pounds per thousand gallons, from about 15 to about 35 pounds per thousand gallons, 15 to about 25 pounds per thousand gallons, or even from about 17 to about 22 pounds per thousand gallons. Generally, the viscosifying polymer can be present in an amount of from about 10 to less than about 60 pounds per thousand gallons of fluid, with a lower limit of polymer being no less than about 10, 11, 12, 13, 14, 15, 16, 17, 18, or 19 pounds per thousand gallons of the fluid, and the upper limited being less than about 60 pounds per thousand gallons, no greater than 59, 54, 49, 44, 39, 34, 30, 29, 28, 27, 26, 25, 24, 23, 22, 21, or 20 pounds per thousand gallons of fluid. In some embodiments, the polymers can be present in an amount of about 30 pounds per thousand gallons. Fluids with polymer based viscosifiers may have any suitable viscosity for a treatment operation, for example a viscosity value of about 30 centipoise (cP) or greater at a shear rate of about 300 $s^{-1}$ at treatment temperature, about 35 cP or greater at a shear rate of about 300 $s^{-1}$, or even about 40 cP or greater at a shear rate of about 300 $s^{-1}$, as measured on a Fann 35 rheometer.

Environmental water/viscosifying polymer/divalent cation mixtures, in some embodiments of the disclosure, development sufficient viscosity in relatively short periods of time such as instantaneous, about 1 minute or greater, about 5 minutes or greater, about 10 minutes or greater, about 30 minutes or greater, longer time periods depending on the particular viscosity increase profile over time desired, or any point between the time periods indicated. In some other embodiments, viscosity does not increase instantaneously, and a short period of time, such as 30 seconds, up to 1 minute, up to 5 minutes, up to 10 minutes, or even up to 30 minutes, elapses before the viscosity increase occurs. In many subterranean formation treatment operations, sufficient viscosity helps ensure solids particles (i.e. proppant, fluid loss additives, gravel, and the like) are transported to select zones in the wellbore and delivered to the formation, such as placement of proppant into fractures. Any suitable rate of viscosity increase upon addition of a divalent cation is within the spirit and scope of the disclosure. In some aspects, the viscosity increase is from about 10% to about 50% after about 10 minutes of hydration and/or mixture of the divalent cation with the produced water. In other aspects, the viscosity increase is from about 15% to about 25% after about 10 minutes of hydration. In yet other aspects, the viscosity increase is from about 10% to about 50% after about 30 minutes of hydration, or even from about 15% to about 25% after about 30 minutes of hydration.

In those aspects where environmental water/viscosifying polymer/divalent cation mixture based fluids are used in fracturing operations, fluid viscosity may also help generate sufficient pressure drop along a fracture to create a wide fracture. To create the fracture, the fluid is pumped into a wellbore at sufficient rate to increase the pressure in the wellbore at perforations to a value greater than the breakdown pressure, or otherwise fracture initiation pressure, of the formation. The breakdown pressure is generally believed to be the sum of the in-situ stress and the tensile strength of the rock. Once the formation is broken down and the fracture created, the fracture can be extended at a pressure called the fracture-propagation pressure. The fracture-propagation pressure is equal to the sum of the in-situ stress, the net pressure drop and the near-wellbore pressure drop. The net pressure drop is equal to the pressure drop down the fracture as the result of viscous fluid flow in the fracture, plus any pressure increase caused by tip effects. The near-wellbore pressure drop can be a combination of the pressure drop of the viscous fluid flowing through the perforations and/or the pressure drop resulting from tortuosity between the wellbore and the propagating fracture. The fracturing-fluid viscosity properties are important in the creation and propagation of the fracture.

In some embodiments of the disclosure, as discussed above, a dual viscosity system may be prepared from the environmental water/viscosifying polymer/divalent cation mixture, where fluid viscosity is increased at an initial phase, and at a later time during the treatment operation. In such embodiments, another constituent, such as a crosslinking agent may be added to the treatment fluid in order to crosslink with a viscosifying agent which may be either added to the environmental water, contained within the environmental water source, or both. For example, a zirconium compound, a titanium compound or a borate ion releasing compound may be useful for such purposes. Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. Nos. 3,058,909 and 3,974,077, which are incorporated herein by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Zirconium and titanium may be provided in the form of complexes with any of with various ligands, such as triethanolamine, lactic acid, glutamic acid, sorbitol, sodium gluconate and the like.

Fluids useful in embodiments of the disclosure may include an agent for adjusting and/or control fluid pH, such as an acid, base, buffer, pH stabilizer, or any combination thereof. Fluids at any suitable pH value may be used, and in some embodiments, the pH value may be within practical range or value, such as from about 5.0 to about 6.0. Fluids may further contain one or more conventional additives known to the well service industry such as a gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, temperature stabilizer, solvent or a mixture. Also, they may include a co-surfactant to optimize viscosity or to minimize the formation of stable emulsions that contain components of crude oil. The addition of such additives to the carrier fluids minimizes the need for additional pumps required to add such materials on the fly.

Fluids used in the treatment methods of the disclosure can be used in various applications in a subterranean formation through a wellbore. The fluids may be not foamed, or foamed, or even energized, depending upon the particular formation properties and subterranean formation treatment objective. When foamed or energized, any suitable gas that forms a foam or an energized fluid when introduced into the aqueous medium can be used. See, for example, U.S. Pat. No. 3,937,283 (Blauer et al.), incorporated herein by reference. The gas component may include a gas selected from the group consisting of nitrogen, air, carbon dioxide and any mixtures thereof. The gas component may comprise nitrogen, in any quality readily available. The gas component may in some cases assist in a treatment operation and/or well clean-up process. The fluid may contain from about 10% to about 90% volume gas component based upon total fluid volume percent, or from about 30% to about 80% volume gas component based upon total fluid volume percent, or from about 40% to about 70% volume gas component based upon total fluid volume percent.

In some embodiments, the environmental water/viscosifying polymer/divalent cation mixtures may also be used with a proppant as set forth above, or other solid particulates. The proppant, or other solid particulates, are suspended in the mixture, and introduced into the subterranean formation at a pressure equal to or above the fracturing initiation pressure of the subterranean formation. Conventional propped hydraulic fracturing methods may be used, with appropriate adjustments if necessary, as will be apparent to those skilled in the art. In some embodiments, the fracture stimulation treatment typically begins with a conventional pad stage using an environmental water/viscosifying polymer/divalent cation mixture to generate the fracture. In such cases, the proppant-free fluid, or pad, with sufficient viscosity, is pumped into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. This may be conducted in a sequence of stages in which the environmental water/viscosifying polymer/divalent cation mixture transports proppant into the fracture as the fracture is propagated. In some cases, in this sequence of stages, the amount of propping agent is increased, normally stepwise. The pad and carrier fluid can be a gelled aqueous fluid, such as the brine solution having an environmental water/viscosifying polymer/divalent cation mixture thickened with a viscosifying polymer. The pad and carrier fluids may contain various additives. Non-limiting examples are fluid loss additives, crosslinking agents, clay control agents, and mobility control agents such as fibers, breakers and the like. In the fracturing treatments, the environmental water/viscosifying polymer/divalent cation based fluids may be used in the pad treatment, the proppant stage, or both. The components of the fluid may be mixed on the surface. Alternatively, a portion of the fluid may be prepared on the surface and pumped down a tubing while another portion could be pumped down the annular to mix down hole.

Another embodiment includes use of environmental water/viscosifying polymer/divalent cation based fluids for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore.

In another embodiment, environmental water/viscosifying polymer/divalent cation based fluids are useful for gravel packing a wellbore. As a gravel packing fluid, it may comprise gravel or sand and other optional additives such as filter cake clean up reagents such as chelating agents, acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh. In addition to gravel packing, fracturing or cleanup, fluids and methods according to the disclosure may be used for any other suitable subterranean formation treatment/operation, including, but not limited to, drilling, acidizing, completion, diversion techniques, and the like. Also, the disclosure is not only limited to methods for treating a subterranean formation, but may also be applied to any other oilfield or non-oilfield application where environmental water is used to prepare viscous fluids.

EXAMPLES

Examples were carried out by simulating environmental water brines, and adding analytes to ascertain the effect of the analyte(s) on the fluid viscosity. The simulated environmental water was several 15% by weight brines of various salts, and analytes such as boron, calcium, magnesium, sodium and/or potassium were admixed in many different concentrations and combinations. The samples were prepared and tested in a pH range of from about 5.0 to about 6.0. Hydration tests were performed at ambient temperature with a Waring blender equipped with a digital revolutions per minute (RPM) readout. The viscosity was measured on the samples disclosed below with a Fann 35 rheometer, and the dial centipoise (cP) viscosity value was acquired at 300 RPM at the fluid temperature indicated, at a shear rate of 511 s$^{-1}$, unless otherwise indicated.

In a first example (results shown in Table 1), a brine of Morton® sodium chloride salt was prepared by adding the salt at a concentration of 15% by weight to fresh water. A linear viscosifying polymer (guar) was added in a concentration of 30 pounds per thousand gallons of fluid (ppt) to each sample evaluated. A pH stabilizer containing acetic acid and propan-2-ol was added to each sample in the amount indicated. Boron, added in the form of sodium tetraborate decahydrate, was tested with the 15% sodium chloride brine. As shown in Table 1, boron, added at 100 ppm, 200 ppm, 500 ppm or 1000 ppm, did not increase fluid viscosity at the times measurements were taken.

Figure 1:
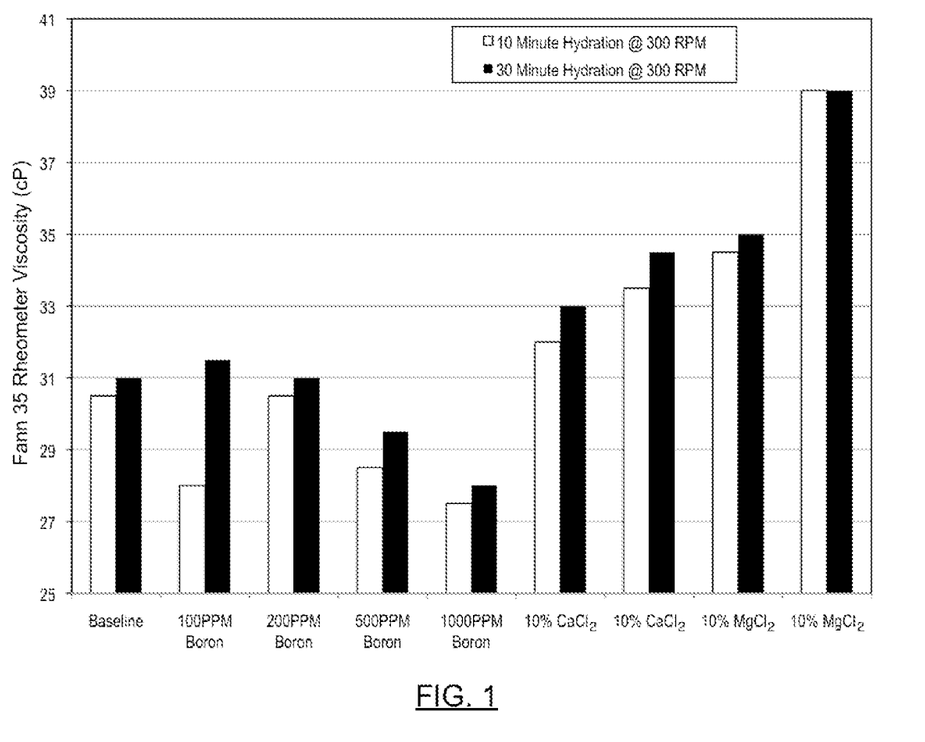
FIG. 1 graphically illustrates use of brine containing Morton® sodium chloride salt to prepare fluids and comparison of viscosity increase with addition of different divalent cations to a brine, in accordance with some aspects of the disclosure.

As further shown in Table 1, and FIG. 1, the 5% and 10% by weight calcium chloride (CaCl$_2$)/guar/brine mixture showed a about 4% to about 10% increase in fluid viscosity compared with the 15% sodium chloride baseline brine after 10 minutes of hydration, and a about a 6% to about 12% increase after 30 minutes of hydration. The 5% and 10% by weight magnesium chloride (MgCl$_2$)/guar/brine mixture had a slightly higher increase with about 13% to about 28% increase in fluid viscosity after 10 minutes of hydration, and about 12% to about 26% increase after 30 minutes of hydration. Another observation from the studies is the potential to be used to create a dual viscosity system at low pH, where a divalent brine is added to the linear gel to increase early viscosity, and then another crosslinker may be added for viscosity increase at a later time.

TABLE 1

| Fluid Description | pH Stabilizer | Adjusted pH | 10 Minute Hydration @ 300 RPM/Temp | 30 Minute Hydration @ 300 RPM/Temp |
|---|---|---|---|---|
| 15% NaCl brine baseline | 0.06 mL | 5.53 | 30.5 cP/71.0 deg F. | 31.0 cP/75.0 deg F. |
| 15% NaCl brine with 100 PPM Boron | 4.0 mL | 5.34 | 28.0 cP/71.7 deg F. | 31.5 cP/73.2 deg F. |
| 15% NaCl brine with 200 PPM Boron | 5.6 mL | 5.55 | 30.5 cP/72.3 deg F. | 31.0 cP/74.6 deg F. |
| 15% NaCl brine with 500 PPM Boron | 18.41 mL | 5.54 | 28.5 cP/73.4 deg F. | 29.5 cP/75.2 deg F. |
| 15% NaCl brine with 1000 PPM Boron | 37.11 mL | 5.54 | 27.5 cP/72.8 deg F. | 28.0 cP/74.4 deg F. |
| 15% NaCl brine with 5% CaCl$_2$ | 1.46 mL | 5.53 | 32.0 cP/77.5 deg F. | 33.0 cP/77.9 deg F. |
| 15% NaCl brine with 10% CaCl$_2$ | 2.70 mL | 5.55 | 33.5 cP/83.1 deg F. | 34.5 cP/81.1 deg F. |
| 15% NaCl brine with 5% MgCl$_2$ | 0.06 mL | 5.44 | 34.5 cP/72.8 deg F. | 35.0 cP/74.1 deg F. |
| 15% NaCl brine with 10% MgCl$_2$ | 0.05 mL | 5.52 | 39.0 cP/73.4 deg F. | 39.0 cP/75.3 deg F. |

In a second example, a brine of Morton® sodium chloride salt was prepared by adding the salt at a concentration of 15% by weight as above, a linear viscosifying polymer (guar) added in an amount of 30 ppt, and a pH stabilizer added to each sample in the amounts indicated. Varied mixtures of calcium chloride (CaCl$_2$) and magnesium chloride (MgCl$_2$) were evaluated in the samples, as shown in Table 2. Addition of a combination of 2% by weight CaCl$_2$ and 8% by weight MgCl$_2$ gave an increase of about 20% in fluid viscosity after 10 minutes of hydration, and after 30 minutes of hydration. A combination of 5% by weight CaCl$_2$ and 5% by weight MgCl$_2$ resulted in an increase of about 13% in fluid viscosity after 10 minutes of hydration, and an increase of about 14% in fluid viscosity after 30 minutes of hydration. A combination of 8% by weight CaCl$_2$ and 2% by weight MgCl$_2$ resulted in an increase of about 16% in fluid viscosity after 10 minutes of hydration, and after 30 minutes of hydration.

TABLE 2

| Fluid Description | pH Stabilizer | Adjusted pH | 10 Minute Hydration @ 300 RPM/Temp | 30 Minute Hydration @ 300 RPM/Temp |
|---|---|---|---|---|
| 15% NaCl brine baseline | 0.07 mL | 5.55 | 31.5 cP/71.0 deg F. | 31.5 cP/73.2 deg F. |
| 15% NaCl brine with 2% CaCl$_2$ & 8% MgCl$_2$ | 0.46 mL | 5.55 | 38.0 cP/75.0 deg F. | 38.0 cP/77.5 deg F. |
| 15% NaCl brine with 5% CaCl$_2$ & 5% MgCl$_2$ | 1.09 mL | 5.53 | 35.5 cP/82.0 deg F. | 36.0 cP/84.2 deg F. |
| 15% NaCl brine with 8% CaCl$_2$ & 2% MgCl$_2$ | 1.8 mL | 5.56 | 36.5 cP/75.3 deg F. | 36.5 cP/76.0 deg F. |

Table 3 illustrates a third example where a brine of reagent grade sodium chloride salt was prepared by adding the salt at a concentration of 15% by weight to fresh water, a linear viscosifying polymer (guar) added in an amount of 30 ppt, and a pH stabilizer added to each sample in the amounts indicated. A 10% by weight calcium chloride (CaCl$_2$)/brine mixture showed up to about a 15% increase in fluid viscosity compared with the 15% sodium chloride baseline brine after 10 minutes of hydration, and after 30 minutes of hydration. 10% by weight magnesium chloride (MgCl$_2$)/brine mixture had a slightly higher increase with up to about 23% increase in fluid viscosity after 10 minutes of hydration, and after 30 minutes of hydration.

TABLE 3

| Fluid Description | pH Stabilizer | Adjusted pH | 10 Minute Hydration @ 300 RPM/Temp | 30 Minute Hydration @ 300 RPM/Temp |
|---|---|---|---|---|
| 15% NaCl brine baseline | 0.02 mL | 5.52 | 31.0 cP/70.7 deg F. | 31.5 cP/72.8 deg F. |
| 15% NaCl brine baseline | 0.01 mL | 5.46 | 30.5 cP/72.6 deg F. | 31.0 cP/74.6 deg F. |
| 15% NaCl brine with 10% CaCl$_2$ | 2.38 mL | 5.56 | 35.0 cP/78.2 deg F. | 35.5 cP/79.1 deg F. |
| 15% NaCl brine with 10% MgCl$_2$ | 0.03 mL | 5.51 | 37.5 cP/77.0 deg F. | 38.0 cP/79.3 deg F. |

Figure 2:
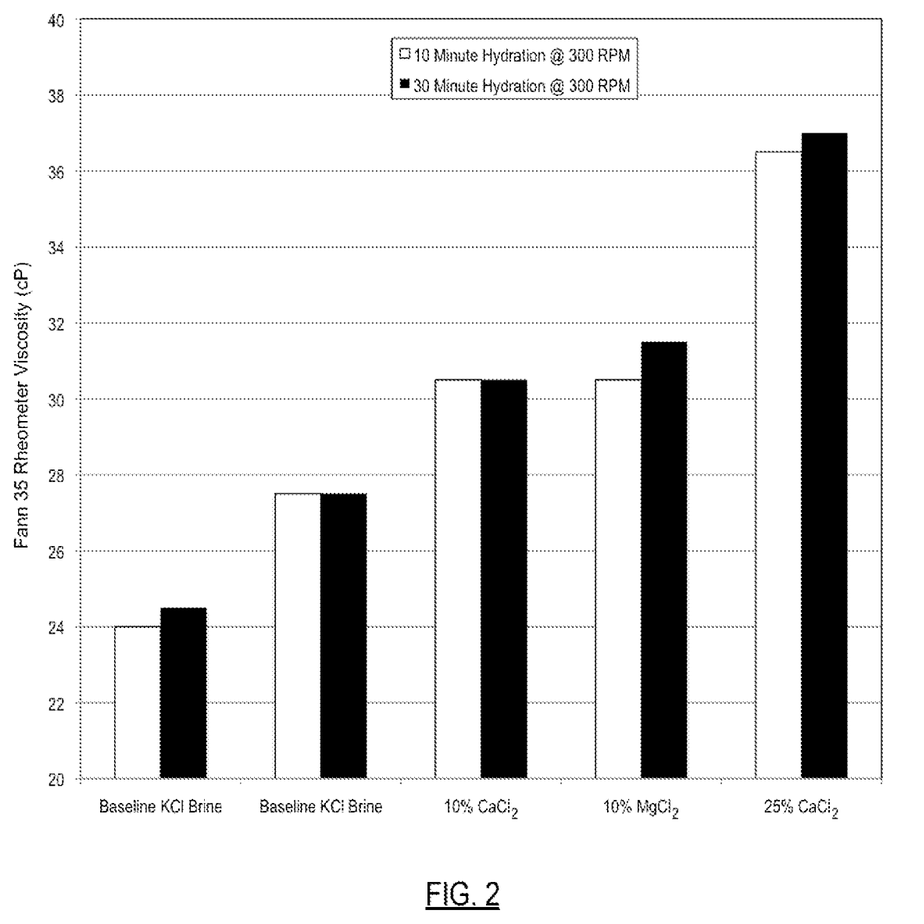
FIG. 2 graphically depicts use of brine containing potassium chloride salt to prepare fluids and comparison of viscosity increase with addition of divalent cations and amounts to a brine, according to other aspects of the disclosure.

As shown in Table 4, and FIG. 2, a fourth example is provided where a brine of reagent grade potassium chloride salt was prepared by adding the salt at a concentration of 15% by weight to fresh water, a linear viscosifying polymer (guar) added in an amount of 30 ppt, and a pH stabilizer added to each sample in the amounts indicated. A 10% by weight calcium chloride (CaCl$_2$)/guar/brine mixture showed up to about 27% increase in fluid viscosity after 10 minutes of hydration, and up to about 24% increase after 30 minutes of hydration. 10% by weight magnesium chloride (MgCl$_2$)/guar/brine mixture showed up to about 27% increase in fluid viscosity after 10 minutes of hydration, and up to about 29% increase in fluid viscosity after 30 minutes of hydration. A 25% by weight calcium chloride (CaCl$_2$)/guar/brine mixture resulted in up to about 52% increase in fluid viscosity after 10 minutes of hydration, and up to about 51% increase after 30 minutes of hydration.

TABLE 4

| Fluid Description | pH Stabilizer | Adjusted pH | 10 Minute Hydration @ 300 RPM/Temp | 30 Minute Hydration @ 300 RPM/Temp |
|---|---|---|---|---|
| 15% KCl brine baseline | 0.01 mL | 5.28 | 24.0 cP/68.9 deg F. | 24.5 cP/69.9 deg F. |
| 15% KCl brine baseline | 0.01 mL | 5.35 | 27.5 cP/69.0 deg F. | 27.5 cP/71.0 deg F. |
| 15% KCl brine with 10% CaCl$_2$ | 2.47 mL | 5.51 | 30.5 cP/72.1 deg F. | 30.5 cP/74.3 deg F. |
| 15% KCl brine with 10% MgCl$_2$ | 0.01 mL | 5.45 | 30.5 cP/77.5 deg F. | 31.5 cP/79.1 deg F. |
| 15% KCl brine with 25% CaCl$_2$ | 5.60 mL | 5.56 | 36.5 cP/80.2 deg F. | 37.0 cP/79.5 deg F. |

Figure 3:
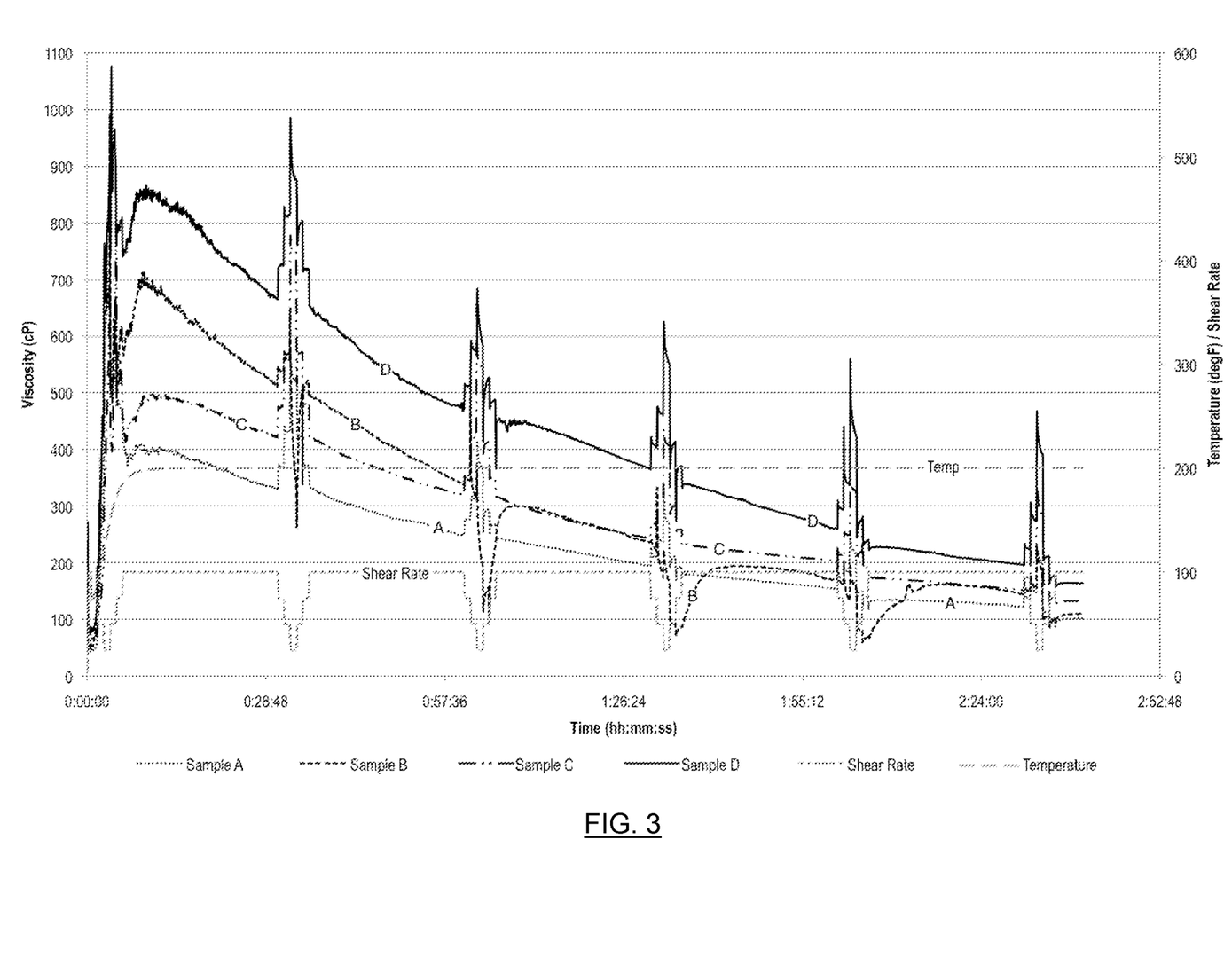
FIG. 3 graphically presents a plot of viscosity over time for an example, where viscosity increase with addition of divalent magnesium cations to sodium chloride brines occurs, in accordance with some aspects of the disclosure; and, FIG. 4 graphically presents a plot of viscosity over time for an example, where viscosity increase with addition of varied levels of divalent magnesium cations to sodium chloride brines results, in accordance with some aspects of the disclosure.

FIG. 3 graphically presents a plot of viscosity over time for a fifth example, where viscosity increase with addition of divalent magnesium cations to viscosified sodium chloride brines is described. The sodium chloride concentration for the brine used to prepare the sample fluids was 15% by weight, and pH was 5.55. Guar viscosifier was added to the brine in the amounts listed in Table 5, below, and magnesium chloride (MgCl$_2$) was added to samples B and D as indicated in the table. Samples A and B further included 39 ppm of zirconium crosslinker and samples C and D had 48 ppm, added in the form of zirconium lactate. The samples were individually prepared, and viscosity measured on the Chandler 5550 rheometer over about a 2.7 hour time period. Samples were heated to and held at a temperature of about 200 degrees Fahrenheit during the tests, and shear rate was held at about 100 s$^{-1}$, except where cycled down at set intervals, as shown in FIG. 3. As indicated in the plot in FIG. 3, sample D containing 30 pounds per thousand (ppt) guar and 5 weight percent MgCl$_2$ showed a significant and sustained increase in viscosity as compared with sample C, which did not contain MgCl$_2$. The same trend was observed for sample B in comparison with sample A.

TABLE 5

| Sample | Guar Amount (ppt) | MgCl$_2$ Amount (weight %) | Zirconium Amount (ppm) |
|---|---|---|---|
| A | 25 | 0 | 39 |
| B | 25 | 5 | 39 |
| C | 30 | 0 | 48 |
| D | 30 | 5 | 48 |

Figure 4:
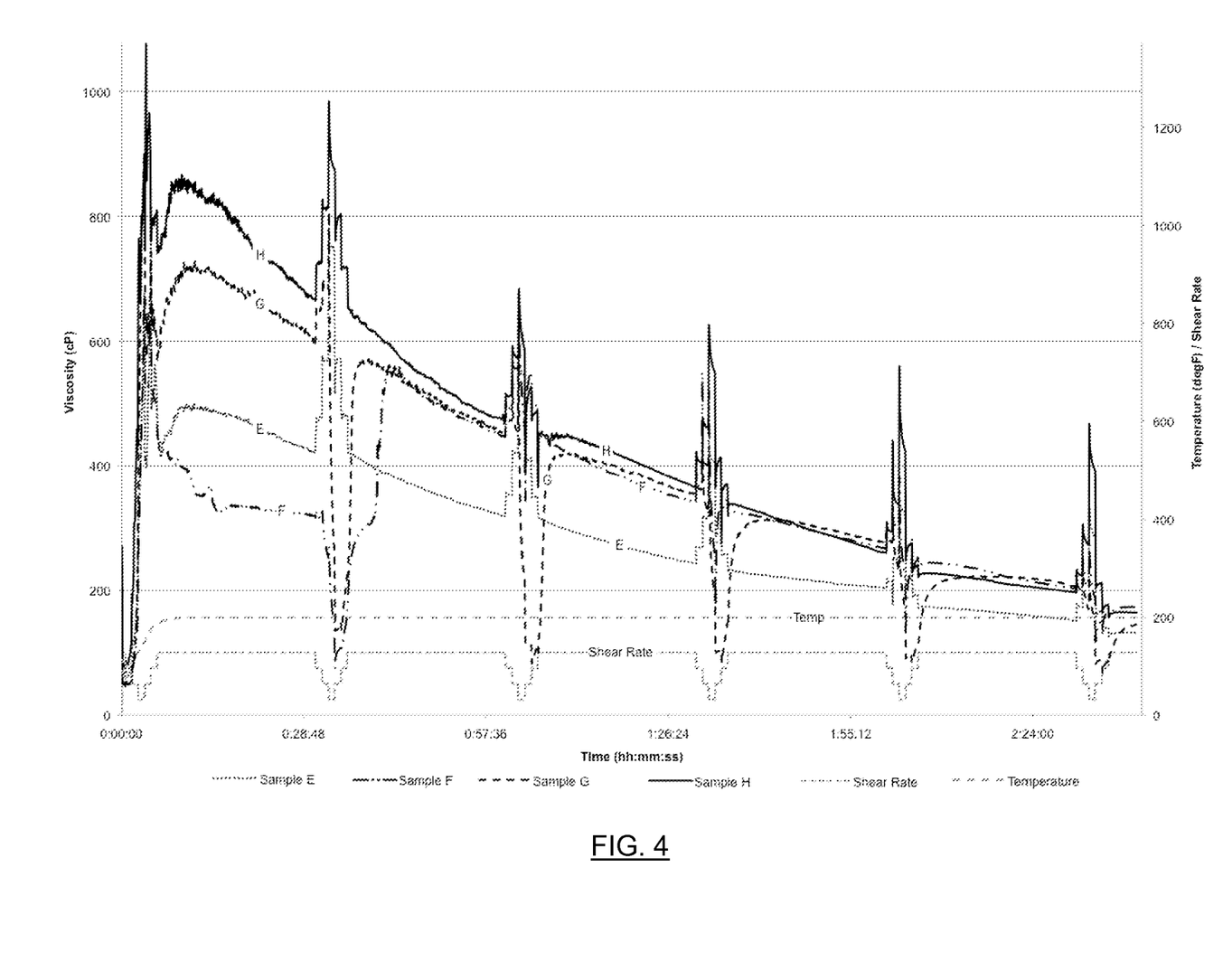

In a sixth example, a brine of sodium chloride salt was prepared by adding the salt at a concentration of 15% by weight, and pH was adjusted to about 5.5 for the samples. A linear viscosifying polymer (guar) was added in an amount of 30 ppt. Varied amounts of magnesium chloride (MgCl$_2$) were evaluated in the samples F through H, as shown in Table 6, and compared with a baseline control without MgCl$_2$. Each of the samples contained 48 ppm of zirconium crosslinker, added in the form of zirconium lactate. The samples were individually prepared, and viscosity measured on the Chandler 5550 rheometer over about a 2.7 hour time period. Samples were heated to and held at a temperature of about 200 degrees Fahrenheit during the tests, and shear rate was held at about 100 s$^{-1}$, unless cycled down at set intervals shown in FIG. 4. The results indicate that lower concentrations of MgCl$_2$, below about 5 weight %, provide increased viscosity benefit when at least one divalent cation, guar and environmental water are admixed, in comparison to no presence of any divalent cation.

TABLE 6

| Sample | Guar Amount (ppt) | MgCl$_2$ Amount (weight %) |
|---|---|---|
| E | 30 | 0 |
| F | 30 | 1.5 |
| G | 30 | 2.5 |
| H | 30 | 5 |

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In addition to the embodiments described above, the subterranean formation treatment fluid additives described above may also be included in the treatment chemistry. This list of additives is not exhaustive and additional additives known to those skilled in the art that are not specifically cited fall within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of treating a subterranean formation penetrated by a wellbore, the method comprising:
providing environmental water, the environmental water being produced water containing a monovalent salt comprising sodium chloride or potassium chloride;
admixing a viscosifying amount of a polymer and at least one divalent cation with the environmental water to form a first admixture; and
pumping the first admixture through the wellbore at a rate and pressure sufficient to treat the subterranean formation;
wherein, at ambient temperature, a first viscosity of the first admixture increases by at least 10% over at least a 10-minute period after the polymer, the at least one divalent cation and the environmental water are admixed,
the at least one divalent cation is present in the first admixture at a concentration between 1% and about 30% by weight; and
the first viscosity of the first admixture is higher than a second viscosity of a second admixture that does not contain the at least one divalent cation.

2. The method of claim 1, wherein, at ambient temperature, the viscosity of the first admixture increases from about 15% to about 50%.

3. The method of claim 1, wherein, at ambient temperature, the viscosity of the first admixture increases by at least 10% over at least a 30 minute period after the polymer, the at least one divalent cation and the environmental water are admixed.

4. The method of claim 1, wherein the at least one divalent cation is selected from the group consisting of barium, calcium, copper(II), iron(II), magnesium, manganese(II), strontium, tin(II), zinc, and mixtures thereof.

5. The method of claim 4, wherein the at least one divalent cation is provided as a salt with one or more anions selected from the group consisting of acetate, nitrate, chloride, bromide, iodide, sulfate ion, bicarbonate, and mixtures thereof.

6. The method of claim 1, wherein the viscosifying polymer is admixed in an amount of from about 5 ppt to about 60 ppt.

7. The method of claim 1, further comprising adding a crosslinker to the first admixture.

8. The method of claim 1, wherein the first admixture is pumped through the wellbore at a rate and pressure sufficient to initiate or extend a fracture in the formation.

9. A method of preparing a fluid, the method comprising:
providing environmental water, the environmental water being produced water containing a monovalent salt comprising sodium chloride or potassium chloride; and
admixing a viscosifying amount of a polymer and at least one divalent cation with the environmental water to form a first admixture;
wherein, at ambient temperature, a first viscosity of the first admixture increases by at least 5% over at least a 30 minute period after the polymer, the at least one divalent cation and the environmental water are admixed,
the at least one divalent cation is present in the admixture at a concentration between 1% and about 30% by weight; and
the first viscosity of the first admixture is higher than a second viscosity of a second admixture that does not contain the at least one divalent cation.

10. The method of claim 9, wherein, at ambient temperature, the viscosity of the first admixture increases by at least 10% over at least a 10 minute period after the polymer, the at least one divalent cation and the environmental water are admixed.

11. The method of claim 10, wherein, at ambient temperature, the viscosity of the first admixture increases from about 15% to about 50%.

12. The method of claim 9, wherein, at ambient temperature, the viscosity of the first admixture increases from about 10% to about 50%.

13. The method of claim 9, wherein the at least one divalent cation is selected from the group consisting of barium, calcium, copper(II), iron(II), magnesium, manganese(II), strontium, tin(II), zinc, and mixtures thereof.

14. The method of claim 13, wherein the at least one divalent cation is provided as a salt with one or more anions selected from the group consisting of acetate, nitrate, chloride, bromide, iodide, sulfate ion, bicarbonate, and mixtures thereof.

15. A method, comprising:
providing environmental water, the environmental water being produced water containing a monovalent salt comprising sodium chloride or potassium chloride;
admixing a viscosifying amount of a polymer and at least one divalent cation with the environmental water to form a first admixture having a first viscosity;
adding a proppant to the first admixture;
pumping the first admixture through a wellbore penetrating a subterranean formation; and
placing the proppant in a fracture formed in the subterranean formation,
wherein, at ambient temperature, the at least one divalent cation is present in the first admixture at a concentration between 1% and about 30% by weight, the viscosity of the first admixture increases by at least 5% over at least a 10-minute period after the polymer, the at least one divalent cation and the environmental water are admixed; and
the first viscosity of the first admixture is higher than a second viscosity of a second admixture that does not contain the at least one divalent cation.

16. The method of claim 15, wherein the subterranean formation is fractured.

17. The method of claim 15, wherein, at ambient temperature, the viscosity of the first admixture increases from about 10% to about 50%.

18. The method of claim 15, wherein the at least one divalent cation is selected from the group consisting of barium, calcium, copper(II), iron(II), magnesium, manganese(II), strontium, tin(II), zinc and mixtures thereof.

19. The method of claim 18, wherein the at least one divalent cation is provided as a salt with one or more anions selected from the group consisting of acetate, nitrate, chloride, bromide, iodide, sulfate ion, bicarbonate, and mixtures thereof.

20. The method of claim 15, wherein the viscosifying polymer is admixed in an amount of from about 5 ppt to about 60 ppt.

21. The method of claim 15, further comprising adding a crosslinker to the first admixture.

* * * * *